United States Patent [19]

Dydzyk

[11] 3,856,275

[45] Dec. 24, 1974

[54] APPARATUS FOR MAKING AND STORING HOT ASPHALT PAVING MATERIAL

[76] Inventor: Michael Dydzyk, 11B Queentree Ct., Baltimore, Md. 21207

[22] Filed: Nov. 13, 1972

[21] Appl. No.: 305,756

[52] U.S. Cl. .............................. 259/161, 259/169
[51] Int. Cl. .............................................. B28c 7/16
[58] Field of Search.................... 259/161, 169, 170; 222/129, 132; 214/302, 303

[56] References Cited
UNITED STATES PATENTS
3,363,884  1/1968  Preeman ............................ 259/169

*Primary Examiner*—Harvey C. Hornsby
*Assistant Examiner*—Alan I. Cantor
*Attorney, Agent, or Firm*—Browne, Beveridge, DeGrandi & Kline

[57] ABSTRACT

A plant for mixing hot asphalt paving material is located above a storage bin which has a lower bin discharge outlet at a suitable elevation for discharging into trucks or other transport vehicles. Contiguous storage bins of progressively increasing elevation and capacity extend laterally from the first-mentioned storage bin, and means are provided for conveying hot mix paving material to the storage bins.

10 Claims, 5 Drawing Figures

PATENTED DEC 24 1974   3,856,275

APPARATUS FOR MAKING AND STORING HOT ASPHALT PAVING MATERIAL

This invention relates to a novel relationship between a mixing plant for hot asphalt paving material and bins for retaining the material prior to its discharge into trucks or other transport vehicles.

In the prior art, it has been customary to support mixing plants on the ground with their discharge opening elevated above the ground only a sufficient amount to permit the passage of a transport vehicle therebeneath, so that the mixing plant may release batches of hot mix paving material directly into the transport vehicles.

Prior to my invention, it has been widely recognized that the efficient operation of a mixing plant is improved by using surge or storage bins which are located adjacent to the mixing plant and can retain a number of batches discharged by the mixing plant. It has been customary to use conveyor means which receive the hot asphalt mixture at a relatively low position beneath the plant outlet, and then to convey the material upwardly a considerable distance to deposit it through an inlet opening at the top of the storage vessel bin. This latter objective has been accomplished by using continuous conveyors or batch-type conveying means such as skip cars. The bins have sometimes had rectangular shapes, double insulated walls, and have been of heights which increase according to their distance from the plant.

In contrast to prior approaches, the present invention contemplates placement of the mixing plant atop a storage bin, with the storage bin itself having a lower discharge opening which is sufficiently elevated to release its contents into a truck or other transport vehicles located therebeneath. It is preferred that there be several other storage bins which extend laterally from the first bin. All storage bins are provided with lower discharge openings at the same elevation, but the bins increase progressively in height in a known manner to provide different capacities for different types of hot mix paving materials. Means are provided for conveying and depositing the hot mixture to the inlet openings located at the top of the storage bins.

For a more complete understanding of the invention, reference is made to the accompanying drawings wherein FIG. 1 shows a front elevation of an installation constructed according to the invention and using a skip car conveyor for transporting the hot mix to the bins.

Figure 1:
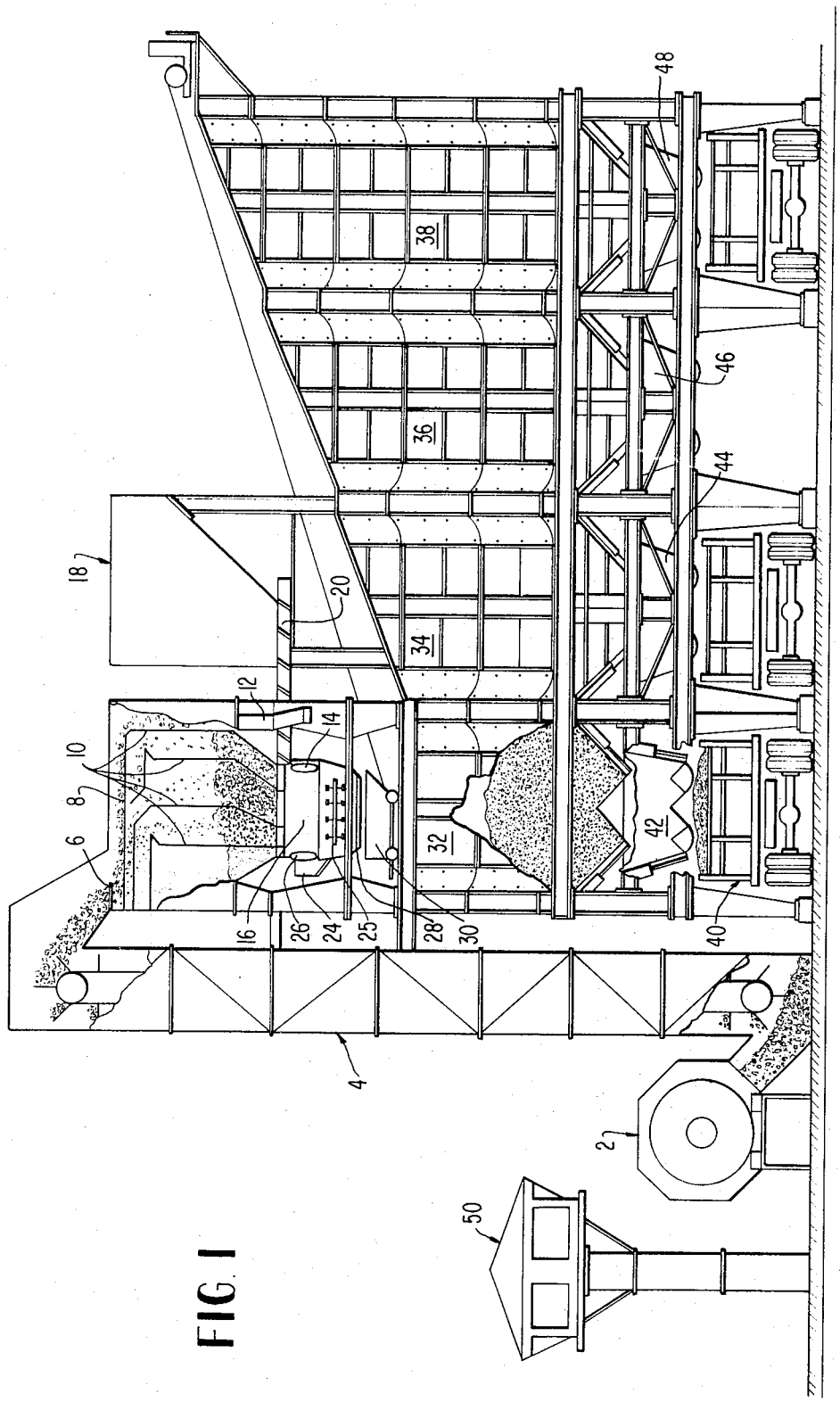

In FIG. 1, it will be seen that the mixing plant for asphalt paving material is of conventional construction, having a dryer 2 for drying the aggregate which is then carried vertically by the hot elevator 4 to the plant itself. The aggregate is received in an upper portion of the plant where it falls on the deflector-spreader plates 6 and then to the horizontal vibrating screen 8 which has openings of different sizes for segregating the aggregate and discharging it into compartments according to particle size. The partitions 10 define the boundaries of different compartments, each of which is designated to hold aggregate particles within a given size range. Oversized particles are discharged through the apparatus through the chute 12.

An aggregate scale 14 weighs selected amounts of the different-sized aggregates into the desired proportions as they are fed into the aggregate batcher 16. If mineral filler dust is required, it is transported from the silo 18 by a conveyor 20 into the aggregate batcher 16. At the same time the aggregate is being weighed, hot bitumen is pumped from a storage tank to the asphalt bucket 24 which is provided with a scale 26 for weighing the bitumen.

The contents of the aggregate batcher 16 and the asphalt bucket 24 are then discharged into the batch-type pugmill mixer 25 which is provided with agitators for thoroughly mixing the materials in a time period of about one minute. Then, the pugmill gate 28 is opened and hot mix asphalt paving material is gravitationally released through the discharge outlet passage of the mixing plant. In the illustrated position of FIG. 1, the skip car 30 lies in the path of the material discharged by the plant. The skip car is movable on a track to a selected storage bin, and it is provided with a sliding bottom wall which, when opened, will release the skip car contents into a selected one of the storage vessels 32, 34, 36 and 38, each of which is provided with an inlet opening in its upper wall. These inlet openings are normally closed by retractable sliding gates. The sliding gate on the first storage bin 32 is located immediately below the mixing plant, at a position where the material discharged by the mixing plant will fall directly into the first storage bin 32 when the skip car is displaced from the illustrated position or when the bottom wall of the skip car is in its open position.

When it is desired to load a truck 40, the sliding discharge gates at the lower end of the appropriate storage bin are retracted, thereby releasing the hot asphalt paving material into weigh hoppers 42, 44, 46 or 48 which are suspended in a known manner and associated with scale which indicates the weight of the contents. Weigh hoppers of this type are manufactured by and available from Howe Richardson Scale Company, Rutland, Vermont. Finally, the swinging gates at the bottom of the loaded weigh hopper are opened by an associated hydraulic cylinder to release its contents into the truck 40. Throughout all of these operations, the various elements may be controlled by a single person stationed in the control center 50.

It will be observed in FIG. 1 that the bins have discharge openings at substantially the same elevation, and inlet openings which increase in height according to their distance from the plant. This, coupled with the positioning of the plant atop a bin, provides for a given storage capacity in a minimum space and with a minimum overall height. Also, the bins are preferably rectangular and of equal horizontal cross section to permit their fabrication from sets of indentical or similar elements.

Figure 2:
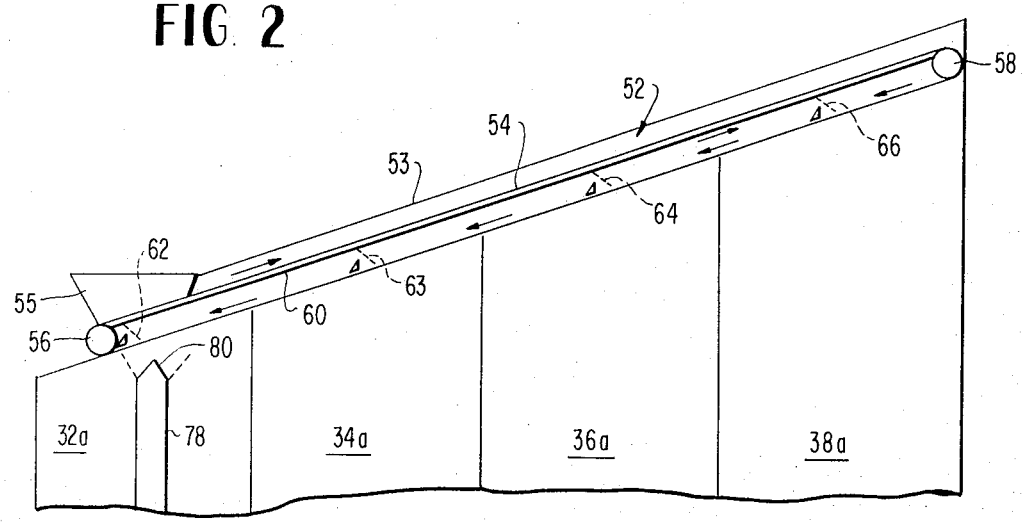
FIG. 2 shows in diagrammatic form another installation embodying the principles of this invention using a slat bar continuous feed conveyor which transports the hot mix material to the storage bins.

FIG. 2 shows a modification of the apparatus which presently is preferred, utilizing a continuous conveyor for transporting the hot mix discharged by the plant to the various bins which in this modification are designated 32a, 34a, 36a and 38a. This conveyor includes two or more endless chains 54 which ride on sprocket assemblies 56 and 58 located at opposite ends of the conveyor. One of the sprocket assemblies 56 or 58 has its shaft positively driven by a motor in order to provide for the movement of the chains in the direction indicated by the arrows in FIG. 2.

The conveyor assembly 52 is enclosed within a housing which includes an upper wall 53. In extremely cold climates, it may be necessary to provide auxiliary heating means within the enclosure 53 to prevent excessive cooling of the hot mix during its movement on the conveyor. At the lower end of the conveyor, there is a hopper 55 which is located precisely in the position of the skip car shown in FIG. 1. For ease of illustration, the plant is not shown in FIG. 2, but it will be understood by those skilled in the art that the discharge opening of the pugmill will be located immediately above the hopper 55.

The upper run of the conveyor is supported on a stationary plate 60 which provides the horizontal support for the hot mix being conveyed to the storage bins. Centrally above each of the storage bins, the plate 60 has swingable gates which are shown in the drawings at 62, 63, 64 and 66. These gates swing downwardly to the position indicated in broken lines, thereby providing an open space in the plate 60 which forms a bin inlet opening and permits the hot mix to slide downwardly across the inclined gate, through the open spaces in the lower run of the conveyor and then into the appropriate storage bin.

Figure 5:
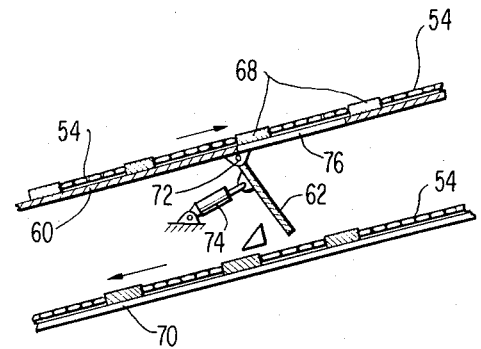
FIG. 5 shows an enlarged view of one form of slat bar conveyor suitable for use in the embodiment of FIG. 2.

A more detailed illustration of the type of conveyor shown in FIG. 2 may be seen in FIG. 5. The upper run of the conveyor is supported on the continuous plate 60. A plurality of slats 68 lie on the plate 60 and extend transversely to the direction of conveyor movement. The slats 68 are connected to two or more of the endless chains 54.

The lower run of the conveyor does not carry a load and therefore the chains and slats are only supported by spaced-apart rails 70 which underlie the chain. Between the rails 70, there are open spaces through which the material discharged by the upper run may fall.

The gate 62 shown in FIG. 5 is mounted for pivotal movement about an axis 72, and its movement is produced by the hydraulic cylinder 74 which moves it from its normal position where the gate 62 is coplanar with the deck 60, to a discharging position illustrated in solid lines in FIG. 5 where the gate 62 assumes an inclined position and presents the bin inlet opening 76 in the plate 60.

Of course, hot mix moving upwardly on the conveyor is supported primarily by the plate 60, and its movement is provided by the slats 68. In instances where the inclination of the conveyor is too great, the slats 68 or portions thereof may extend in a vertical direction to provide better engagement with the hot mix. As the hot mix moves upwardly, it reaches the opening 76 and falls downwardly across the plate 62 and through the spaces between the slats and chain on the lower run. The material then falls into the individual storage bins.

There are some instances where special batches are mixed for discharge into a truck, rather than for intermediate holding in a storage bin. For cases such as this, the apparatus may be provided with a direct chute of the type diagrammatically illustrated at 78 in FIG. 2. This chute has an upper inlet opening normally closed by a pair of deflector gates 80 which are pivotally mounted in positions so as to form a peaked structure which will deflect the material passing through gate 62 into the bin 32a. However, when it is desired to discharge directly into a truck, the gates 80 are pivoted outwardly from the chute closing position to the chute opening position shown in broken lines so as to receive the hot mix falling through the gate 62 and direct it into the chute 78. Depending on the height of the bin 32a, it may be desirable to provide some diverters or splitters internally of the chute 78 in order to reduce the velocity of the material striking the weigh hopper or the bed of a truck. Those skilled in the art will realize that various hydraulic devices may be used for moving the deflector gates 80 from the closed peaked position to their open and mix-receiving position.

Figure 3:
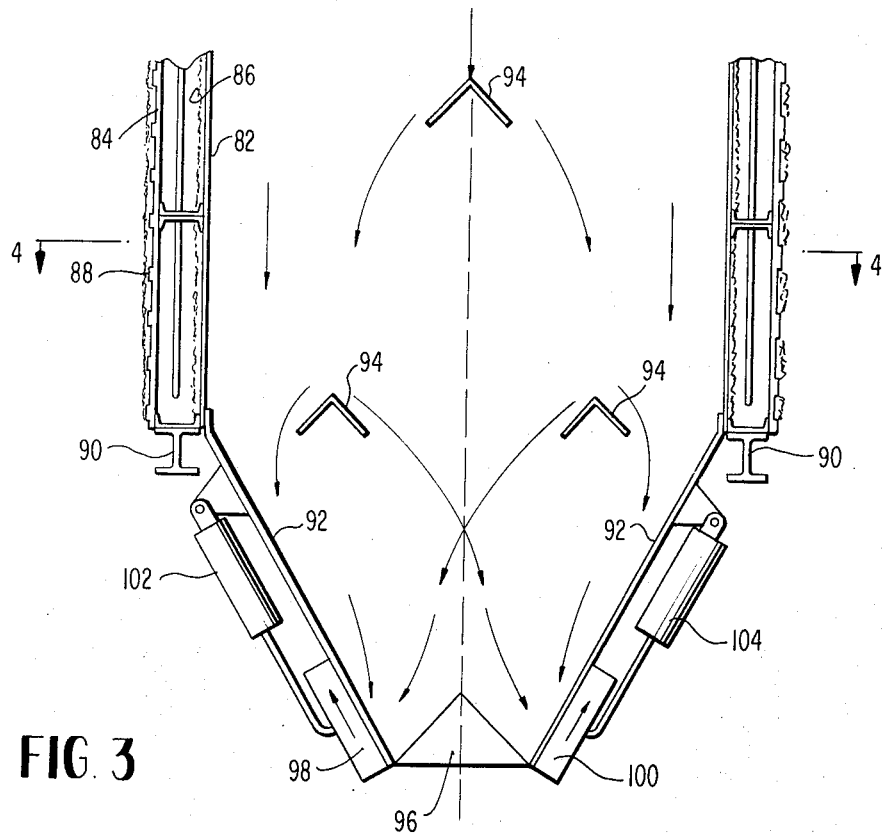
FIG. 3 is a sectional view taken in a vertical plane to illustrate the wall and discharge portions of one of the contiguous bins.
Figure 4:
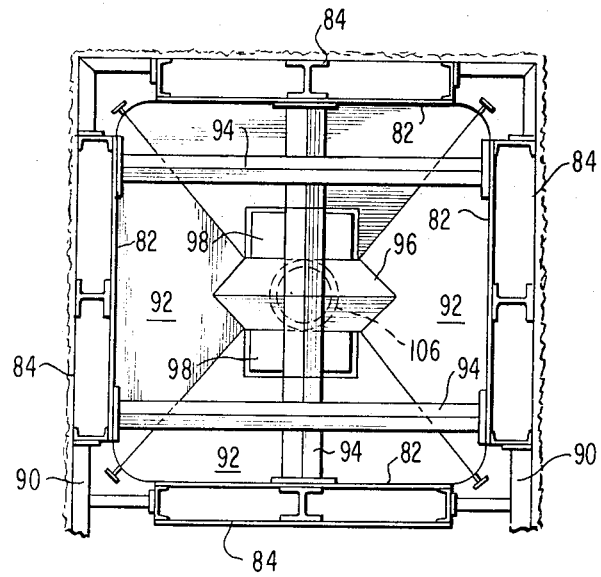
FIG. 4 is a sectional view taken along the line 4—4 in FIG. 3 to show the wall construction of a bin.

An appreciation of the previously-known preferred structure of a bin may be had from studying FIGS. 3 and 4. The sidewalls all are hollow and include an inner panel 82 and an outer panel 84 which provide a heat-insulating air space therebetween. Layers of insulating material are provided on the respective panels at 86 and 88. If desired, the dead air space between the panels may have a heating means such as electrical heating coils or an array of tubing through which a heated liquid is passed.

The principal support for the hoppers comes from the I-beams 90 which are located at the bottom edge of the sidewalls. Extending downwardly from the sidewalls are the inclined bottom panels 92 which form an inverted frusto-pyramidical hopper structure.

Interiorily of the bin, there are flow splitters 94 which serve to break up the flow of material as it moves downwardly to prevent segregation according to particle size. If desired, another set of flow splitters may be provided at right angles to those illustrated in FIG. 3. At the bottom of the bin, a main flow splitter 96 is provided to divert the outflowing material into two paths. One path is normally obstructed by the reciprocating discharge gate 98 and the other path is normally interrupted by the sliding discharge gate 100. These gates move in the directions of the arrows shown thereon in FIG. 3 under the influence of respective hydraulic cylinders which are illustrated at 102 and 104.

When it is desired to discharge some of the contents from a bin, the operator in the control tower will from his remote station operate the hydraulic cylinders 102 and 104 to slide the gates 98 and 100 upwardly, providing openings on the opposite sides of the splitter 96 for releasing the material into a weigh hopper or a truck. The structure shown in FIGS. 3 and 4 requires little modification in instances where the direct discharge chute 78 is used, since the direct discharge chute may go directly through the bottom flow splitter 96 at the position shown in broken lines at 106.

A great number of modifications may be made within the spirit of this invention. For example, different types of mixing plants for asphalt paving material may be used. An auxiliary chute may be used for receiving the flow material from the plant discharge opening and feeding it directly to a truck stationed below the first storage bin. Screw conveyors may be used for feeding the hot mix material to the inlet openings in the upper walls of the various storage bins. Further variations and modifications which will occur to persons skilled in the art may be made within the spirit of the invention.

I claim:

1. Apparatus for making and dispensing a hot mix asphalt paving material, comprising
    plant means for making batches of hot mix asphalt paving material, said plant means having pugmill means of a given maximum capacity for mixing batches of the constituents of an asphalt paving material and discharging the hot mixed batches thereof through a plant outlet passage;
    a first storage bin located directly below the plant means and having an inlet opening for receiving mixed batches discharged through the plant outlet passage, said storage bin being elevated and having an elevated discharge opening at its lower end for releasing paving material into transport vehicles located therebeneath.

2. The apparatus of claim 1 having a plurality of contiguous storage bins extending laterally from the first storage bin, said storage bins having discharge openings at substantially the same elevation and inlet openings which increase in elevation according to their distance from the plant means so as to provide a given total storage capacity in a minimum space and overall height of the apparatus, and conveyor means for moving hot mix paving material from the plant to the storage bins.

3. The apparatus of claim 1 having a second elevated storage bin located adjacent to the first storage bin, said second storage bin having an upper inlet opening and an elevated discharge opening, said elevated discharge opening being located at the lower end of the second storage bin for releasing paving material into transport vehicles therebeneath, and conveyor means for moving paving material from the plant outlet passage to the upper inlet opening of the second storage bin.

4. The apparatus of claim 1 having a chute extending vertically through the first storage bin, said chute having an upper chute inlet opening which lies in the path of material entering the inlet opening of the first storage bin and a lower chute outlet opening positioned to release paving material into a transport vehicle located therebeneath, a deflector means located in the path of material entering the inlet opening of the storage bin and being movable from a chute closing position whereby the material will be diverted into the first storage bin to a chute opening position whereby the material will pass through the chute and into a transport vehicle located below the chute outlet opening.

5. The apparatus of claim 4 wherein the conveyor means is a skip car having a receptacle for holding batches of paving material.

6. The apparatus of claim 4 wherein the conveyor means is a slat bar conveyor.

7. The apparatus of claim 6 wherein the storage vessels are of equal horizontal cross section thereby permitting the utilization of identical elements in their construction, said second storage bin having a high inlet opening which gives it greater capacity than the first storage bin.

8. The apparatus of claim 7 wherein the bins are of contiguous and of rectangular horizontal cross section.

9. The apparatus of claim 8 wherein the bins have sidewalls formed of spaced apart parallel panels with an air space therebetween.

10. The apparatus of claim 9 wherein the parallel panels have heat insulating material on their exterior surfaces.

* * * * *